April 19, 1966 V. B. ERDMAN 3,246,703
SELF-ROTATING ROD WEEDER ATTACHMENT FOR CULTIVATORS
Filed Nov. 12, 1964
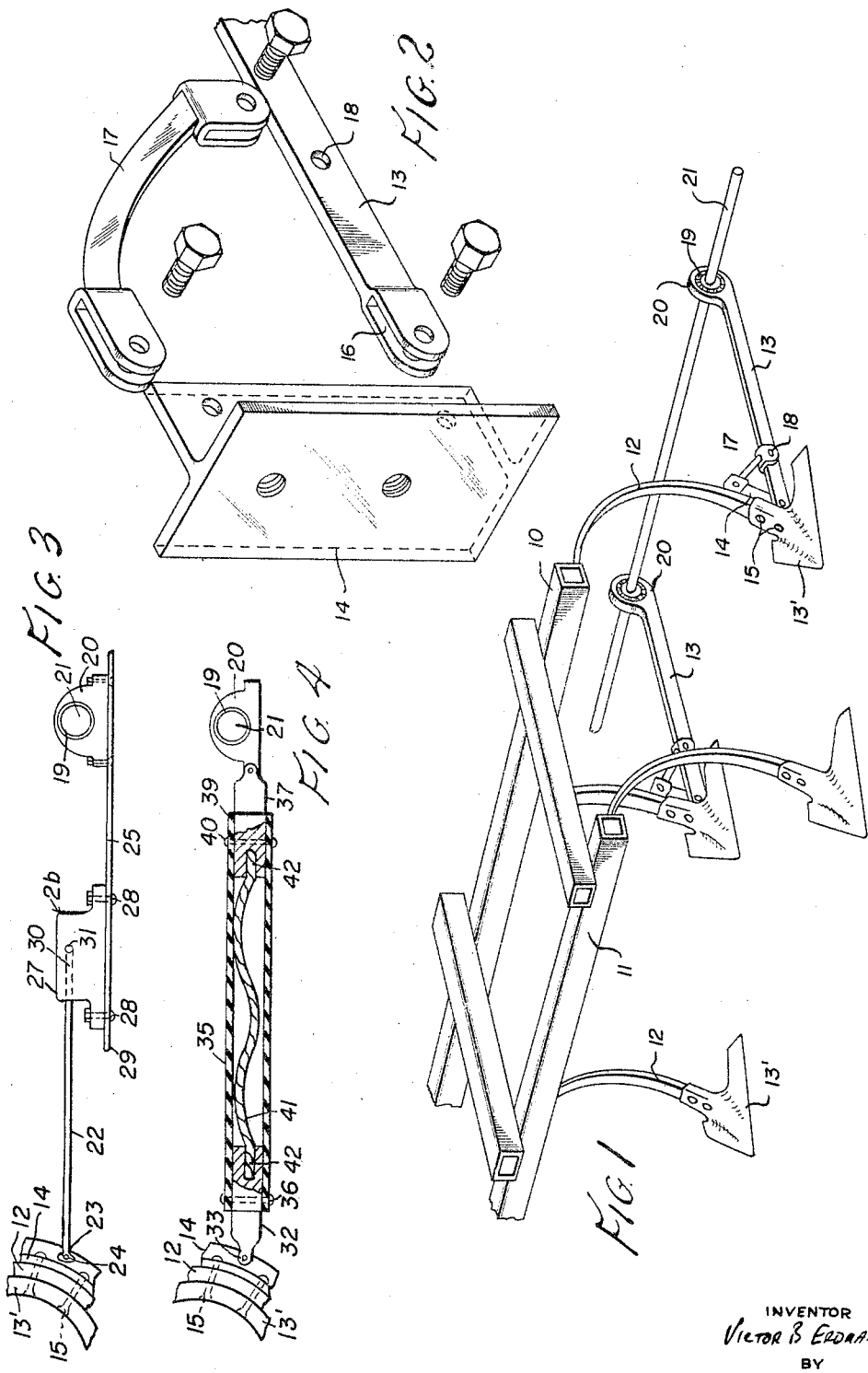
INVENTOR
*Victor B. Erdman*
BY
*T. Chastolough & Heat*
ATTORNEY United States Patent Office 3,246,703
Patented Apr. 19, 1966

3,246,703
SELF-ROTATING ROD WEEDER ATTACHMENT
FOR CULTIVATORS
Victor B. Erdman, 2602 14th Ave. S.,
Lethbridge, Alberta, Canada
Filed Nov. 12, 1964, Ser. No. 410,480
1 Claim. (Cl. 172—44)

My invention relates to new and useful improvements in self rotating rod weeder attachments for cultivators and is a continuation-in-part application of Serial No. 258,188, filed February 13, 1963, now abandoned.

It is well known that rod weeder attachments to cultivators are an advantage inasmuch as that any weeds that may have slipped by the cultivator sweeps are pulled up by the rod and many farmers hold that the number of their cultivator operations have been reduced due to the better weed kill with the rod weeder attachment. This attachment also levels ridges, fills furrows, and packs the soil for an ideal seed bed.

However, such attachments are usually power driven by a wheel through chains or gears so that the weeder rod is rotated from a source of power derived from the tractor. This adds considerable cost, and maintenance due to the fact that the drive must extend partially underground. This extended drive rod is also a constant source of trouble as weeds and trash collect, and wind on it, making it impractical to use on some fields.

I have found that it is not necessary to provide a drive for the weeder rod inasmuch as the cultivator sweeps loosen the soil 2 or 3 inches deep and then as the soil settles down, there is left a more porous section of the soil at the bottom of the ploughed land than above it. This then provides more friction on the upper side of the rod than the bottom so that the rod rotates without any additional drive means from the tractor and operates just as efficiently. For practical application low or anti-friction bearings are required on the rod.

The principal object and essence of my invention is therefore to provide a weeder rod attachment for cultivators mounted in bearings rearwardly of the cultivator sweeps and adapted to operate an external source of power.

Another object of my invention is to provide a device of the character herewithin described which operates efficiently at an extremely economical initial cost and with practically no maintenance cost.

A further object of my invention is to provide a device of the character herewithin described which includes a resilient link between the cultivator shank and the rod weeder in order to protect the ball or roller bearings used on the rod weeder. This is because the shank is continually vibrating when working in the ground and even in the conventional rod weeder, where a hardened cast spool is used, breakage occurs when working in rocky soil.

A still further object of my invention is to provide a device of the character herewithin described which is simple in construction, easy to install in existing cultivators, economical in manufacture and maintenance, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a perspective view of my device secured to a cultivator.

FIGURE 2 is an enlarged fragmentary exploded view showing the method of attachment of the supporter rods to the cultivator shovels.

FIGURE 3 is a side elevation of one embodiment of my invention showing the resilient link.

FIGURE 4 is a side elevation of an alternative embodiment of my invention showing a further form of resilient link.

In the drawings like characters of reference indicate corresponding parts in the different figures.

Proceeding therefore to describe my invention in detail, reference to the accompanying drawings illustrates a conventional cultivator including the transverse beams 10 and 11, each of which carry a plurality of down turned cultivator sweep arms 12. Cultivator shovels 13' are secured to the lower ends of the sweep arms and operate in the conventional manner.

Extending from the sweep arms secured to the rear transverse member 10 is a plurality of horizontal support arms 13, one from each cultivator sweep arm 12.

These arms are secured to the sweep arms 12 adjacent the shovels 13' by means of a bracket 14 secured to the rear of the shovel and arms by means of the shovel attachment bolts 15. The end 16 of the support arm 13 is bolted to the lower end of the bracket 14 and a diagonal brace 17 extends from the upper end of bracket 14 to a point 18 along the support arm 13 spaced from the end 16, thus giving an extremely rigid support for the arms 13.

Ball or roller anti-friction sealed bearings 19 are secured upon the other ends 20 of the horizontal support arms 13 and a weeder rod 21 is journalled for free rotation within these bearings and extends across the entire cultivator parallel to the transverse axis thereof. This weeder rod may be of round or square cross section and is mounted within the bearings as shown.

In operation, the sweeps or shovels 13' normally loosen the soil 2 or 3 inches below the surface and then as the soil settles down there is left a more porous section of the soil at the bottom of the ploughed land than above it, due to the fact that the upper surface is not unduly disturbed.

The rod 21 is preferably situated approximately 16 inches behind the cultivator sweeps 13' which allows the soil to drop down to the ground after the sweeps have lifted it. The rod 21 rides just above the hard pan and in the area of loosened soil. Due to the fact that more friction occurs on the upper side of the weeder rod 21 than at the bottom, the rod rotates at the rate of about 30 r.p.m. This gives another lift to the soil and usually turns the roots of the weeds up to the surface.

It will therefore be seen that I have provided an efficient and relatively simple and inexpensive rod weeder attachment for cultivators which obviates the necessity of sub-surface drive means normally associated with such devices.

In FIGURES 3 and 4, a resilient link is illustrated in order to protect the bearings 19 from shock damage.

Dealing first with the embodiment shown in FIG. 3, reference character 22 illustrates a support arm secured by one end 23 thereof by means of pivot pin 24, to the bracket 14 and extending rearwardly therefrom.

A rear support arm 25 carries the bearing housing 20 within which the bearing 19 is located, thus mounting the rod weeder shaft 21 for rotation.

The resilient link collectively designated 26 comprises a block of resilient material 27 such as rubber or the like secured by means of bolts 28 to the forward end portion 29 of the support bracket 25.

The rear end 30 of the support arm 22 is anchored within the resilient block 22 by means of pin 31 extending therethrough so that a certain resiliency is given to the support arm and bearing, said resiliency being independent in each support arm across the width of the cultivator.

In FIGURE 4 the mounting of the rod weeder 21 within the bearing 19 and housing 20 is similar. However, the resilient link, in this embodiment, comprises mounting means 32 pivotally secured to the bracket 14 by means of pin 33, said mounting means consisting of a relatively short rod secured within one end 34 of a hollow, resilient tube 35 by means of pin 36.

Further means 37 consisting of a similar rod is secured by means of pivot pin 38 to the bearing housing 20 and is also secured within the other end 39 of the resilient hollow tube 35 by means of pin 40.

A flexible link 41 is secured to the inner ends 42 of the rods 32 and 37 as by swaging or the like and this flexible link may consist either of wire cable or similar material.

The length of this flexible link 41 is slightly longer than the length of the resilient hollow tube 35 so that the pull on the weeder rod 21 is normally through the resilient hollow tube 35.

However, if hard or rocky ground is encountered, the resilient tube 35 extends slightly, said resilient elongation being limited by the length of the flexible link 41.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

In a cultivator which includes a plurality of sweep arms depending upon a supporting frame and having cultivator shovels or the like secured to the lower end thereof; a rod weeder attachment for said cultivator comprising in combination a plurality of horizontally disposed support means secured by one end thereof to the lower ends of said sweep arms and extending rearwardly therefrom, bearings supported on the other ends of said horizontally disposed support means and a weeder rod journalled for rotation within said bearings, said horizontally disposed support means including a resilient link along the length thereof providing independent limited endwise resilient movement between any of said horizontally disposed support means and the bearing supported on said other end thereof, said horizontally disposed support means including a bracket portion secured to the rear of said sweep arm, mounting means secured to said bracket and further mounting means secured to said bearing, a resilient hollow tube extending from and secured to said mounting means and said further mounting means, and a flexible link extending through said resilient hollow tube and being secured by the ends thereof to said mounting means and said further mounting means, the length of said flexible link being slightly greater than the length of said resilient hollow tube thereby limiting the resilient elongation of said resilient hollow tube.

References Cited by the Examiner

UNITED STATES PATENTS

| | | | |
|---|---|---|---|
| 1,614,808 | 1/1927 | Suek et al. | 172—720 X |
| 1,912,308 | 5/1933 | Rayburn | 267—21 X |
| 2,117,322 | 5/1938 | Hillman | 43—42.72 X |
| 2,217,818 | 10/1940 | Ronning | 267—8 |
| 2,307,533 | 1/1943 | Neumann et al. | 172—142 |
| 2,528,270 | 10/1950 | Fundingsland | 172—44 |
| 2,660,450 | 11/1953 | Stigum et al. | 267—21 X |
| 2,767,631 | 10/1956 | Mowbray | 172—44 |
| 3,033,294 | 5/1962 | Edwards | 172—44 |

FOREIGN PATENTS

| | | |
|---|---|---|
| 125,732 | 10/1947 | Australia. |
| 26,343 | 11/1912 | Great Britain. |

ABRAHAM G. STONE, *Primary Examiner.*